US009810871B2

(12) United States Patent
Fordham et al.

(10) Patent No.: US 9,810,871 B2
(45) Date of Patent: Nov. 7, 2017

(54) REMOVABLE SPOOL FOR OPTICAL FIBER STORAGE

(71) Applicant: Flextronics AP, LLC, Broomfield, CO (US)

(72) Inventors: Mark Jonathan Fordham, Chapel Hill, NC (US); Joseph John Lommen, Ontario (CA); Ricky Jay Payne, Plano, TX (US)

(73) Assignee: Flextronics AP, LLC, Broomfield, CO (US)

( * ) Notice: Subject to any disclaimer, the term of this patent is extended or adjusted under 35 U.S.C. 154(b) by 0 days.

(21) Appl. No.: 15/140,069

(22) Filed: Apr. 27, 2016

(65) Prior Publication Data
US 2016/0313527 A1 Oct. 27, 2016

Related U.S. Application Data

(60) Provisional application No. 62/153,338, filed on Apr. 27, 2015, provisional application No. 62/153,351, filed on Apr. 27, 2015.

(51) Int. Cl.
*G02B 6/44* (2006.01)

(52) U.S. Cl.
CPC .......... *G02B 6/4457* (2013.01); *G02B 6/445* (2013.01); *G02B 6/4446* (2013.01)

(58) Field of Classification Search
CPC .............................. G02B 6/4457; G02B 6/445
See application file for complete search history.

(56) References Cited

U.S. PATENT DOCUMENTS

| 4,179,060 A * | 12/1979 | Meyers | B65D 5/0227 206/277 |
| 7,359,611 B1 * | 4/2008 | Kaplan | G02B 6/4457 385/134 |
| 2009/0152390 A1 * | 6/2009 | Underbrink | B65H 49/24 242/432.6 |
| 2011/0311266 A1 * | 12/2011 | Taguchi | G03G 15/0817 399/103 |
| 2012/0104145 A1 * | 5/2012 | Dagley | B65H 75/22 242/607.1 |
| 2012/0153069 A1 * | 6/2012 | Allwood | B65H 49/32 242/607 |
| 2014/0161511 A1 * | 6/2014 | Dobbs | B65H 49/38 403/27 |

(Continued)

*Primary Examiner* — Thomas A Hollweg
*Assistant Examiner* — Mary A El Shammaa
(74) *Attorney, Agent, or Firm* — Haverstock & Owens LLP

(57) ABSTRACT

An network interface device (NID) cabinet has removably mounted or fixedly mounted cable spools. The NID cabinet is a small enclosure, typically made of plastic, which sits on the outside wall of an end user's building, such as a home or office. Pre-terminated cables are spooled around each cable spool, and the cable connector at one end of each cable is connected to a network interconnection junction within the NID cabinet. A series of interlocking mounting features are formed on both the cable spool and the mating NID cabinet back wall. Two different types of mounting features enable the cable spool to be removably or fixedly mounted within the NID cabinet. When fixedly mounted, the cable spool can still be removed from the NID cabinet, but only if the spooled cabled is completed un-spooled and removed from the cable spool.

9 Claims, 10 Drawing Sheets

(56) References Cited

U.S. PATENT DOCUMENTS

2014/0241691 A1* 8/2014 Solheid ............... G02B 6/4455
                                                        385/135
2014/0367163 A1* 12/2014 Islam .................... B65H 75/18
                                                        174/70 R

* cited by examiner

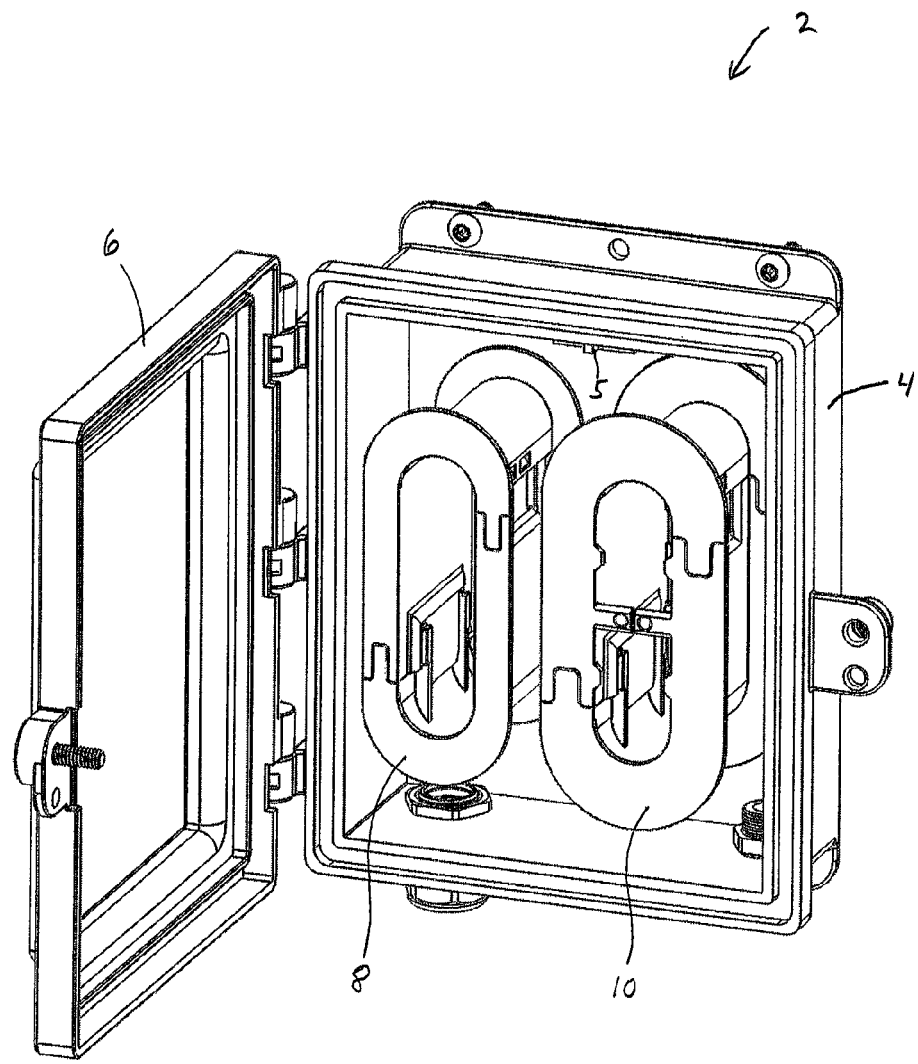
Figure 1

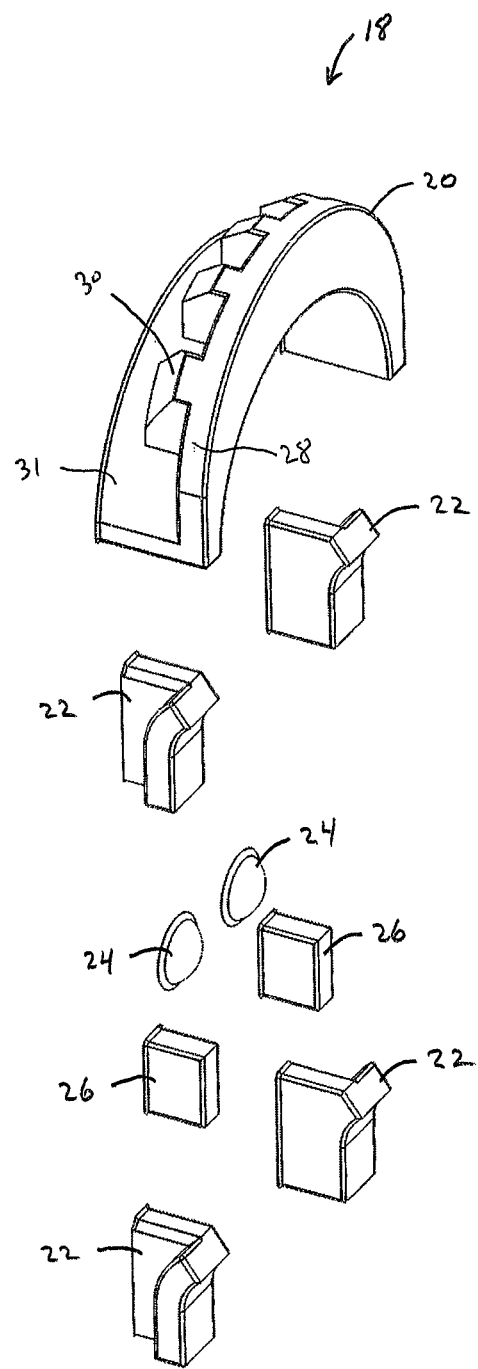
Figure 3

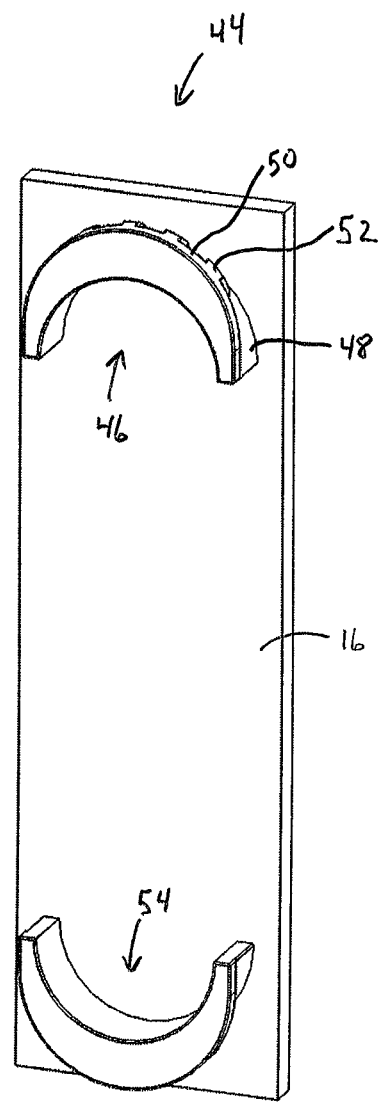
Figure 6
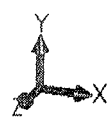

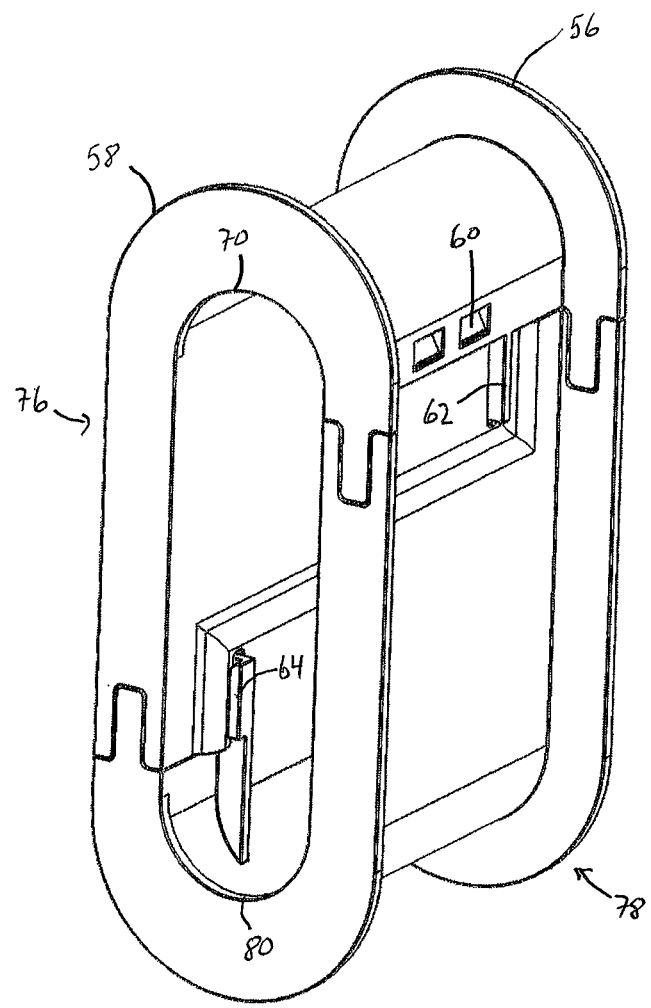
Figure 7

REMOVABLE SPOOL FOR OPTICAL FIBER STORAGE

RELATED APPLICATIONS

This Patent Application claims priority under 35 U.S.C. 119(e) of the U.S. provisional patent application No. 62/153,338, filed on Apr. 27, 2015, and entitled "REMOVABLE SPOOL FOR OPTICAL FIBER STORAGE," which is hereby incorporated by reference in its entirety. This Patent Application also claims priority under 35 U.S.C. 119(e) of the U.S. provisional patent application No. 62/153,351, filed on Apr. 27, 2015, and entitled "FASTENER FREE SPOOL FOR OPTICAL FIBER STORAGE," which is hereby incorporated by reference in its entirety.

FIELD OF THE INVENTION

The present invention is generally directed to optical fiber storage. More specifically, the present invention is directed to a removable spool for optical fiber storage within a network interface device (NID) cabinet.

BACKGROUND OF THE INVENTION

Communications networks, such as cable television, internet and telephone networks, rely on physical transmission cables, such as optical fibers, to interconnect various points within the network. The last leg of such networks is typically the connection between an end user's physical location, such as a house or business office, and a nearby network junction location, such as a junction box located proximate the end user's physical location. The network transmission signal is split at the junction box, and multiple last line cables are connected from the junction box to proximate end user locations. A network interface device (NID) cabinet is typically installed on the side wall or proximate the side wall of the end user's building. The NID cabinet is a small enclosure, typically made of plastic, with a front opening door for access to the interior. A last line cable is strung between the junction box and the NID cabinet. A first end of the last line cable is fitted with a cable connector that mates with a corresponding network interface connector in the junction box. A second end of the last line cable is fitted with a cable connector that mates with a corresponding network interface connector in the NID cabinet. The NID cabinet includes a network interconnection junction having at least two network interface connectors. One network interface connector is configured to mate with the cable connector of the inside wiring cable. Another network interface connector is configured to mate with the cable connector of the last line cable. The network interconnection junction provides an interconnection between the last line cable and the inside wiring cable.

During building of the end user building, insider wiring is terminated at the NID cabinet. External connection between the NID cabinet and the communication network is performed at a later date. Installation of such external connection requires the running of cable between the junction box and the NID cabinet. The last line cable is cut-to-length to meet the distance between the junction box and the NID cabinet. Since the last line cable is cut-to-length on-site at the point of installation, the line connectors are also connected on-site to the ends of the cut last line cable. Connecting line connectors to the cut ends of the last line cable, also referred to as terminating the cable, is time consuming and requires special equipment. It also requires a clean connection which is not always easily achievable in the field. Terminating the cable on-site is also less precise than terminating the cable in the factory.

SUMMARY OF THE INVENTION

Embodiments are directed to an NID cabinet having removably mounted or fixedly mounted cable spools. The NID cabinet is a small enclosure, typically made of plastic, which sits on the outside wall of an end user's building, such as a home or office. Pre-terminated cables are spooled around each cable spool, and the cable connector at one end of each cable is connected to a network interconnection junction within the NID cabinet. A series of interlocking mounting features are formed on both the cable spool and the mating NID cabinet back wall. Two different types of mounting features enable the cable spool to be removably or fixedly mounted within the NID cabinet. When fixedly mounted, the cable spool can still be removed from the NID cabinet, but only if the spooled cable is completely unspooled and removed from the cable spool. Because the cable spool is removable, the NID cabinet may be installed separately during a site survey of the end user location, at which time the required length of cable from an external junction point, such as a junction box, to the NID cabinet is determined. The cable can be brought to the end user location pre-cut and pre-terminated to avoid the need to do time consuming cable cutting, cable termination and cable testing in the field. Pre-terminating the cable eliminates the need for special equipment in the field. Pre-terminating the cable in a factory is cleaner, more precise and more efficient than terminating the cable in the field.

In an aspect, a network interface device cabinet is disclosed. The network interface device includes a base, a removable cable spool and a lid. The base has an interior cavity with a back wall, wherein the back wall comprises removable mounting features. The removable cable spool is configured for a cable to be spooled about the removable cable spool. The removable cable spool comprises cable spool mounting features configured to removably mate with the removable mounting features on the back wall of the base. The lid is coupled to the base to cover and uncover the interior cavity. In some embodiments, the removable mounting features are integral to the back wall. In some embodiments, the base further comprises an enclosed opening extending from the interior cavity to outside the base through which cable is threaded. In some embodiments, the base further comprises a laterally open-ended slot extending from the interior cavity to outside the base through which the cable passes. In some embodiments, the base further comprises a network interconnection junction having multiple network interface connectors, wherein a first end of the cable has a cable interconnect and the cable interconnect is configured to mate with one of the multiple network interface connectors. In some embodiments, the cable spool comprises a first plate and a second plate between which the cable is spooled. In some embodiments, the cable spool mounting features are disposed on the first plate. In some embodiments, the first plate comprises an interior opening, wherein cable spool mounting features comprise a cable spool radius feature formed from a portion of the interior opening in the first plate. In some embodiments, the removable mounting features comprise a cabinet radius feature extending from the back wall, wherein the cabinet radius feature mates with the cable spool radius feature. In some embodiments, the cabinet radius feature comprises a trapping radius and a radius lip, configured such that the cable spool radius feature is positioned on the trapping radius and between the radius lip and the back wall when the removable cable spool is removably mounted. In some embodiments, the cable spool mounting features further comprise a plurality of cable spool interlocking fingers, further wherein the plurality of cable spool interlocking fingers are formed on the first plate and extend into the interior opening of the first plate. In some embodiments, the removable mounting features further comprise a plurality of cabinet interlocking fingers extending from the back wall and configured to mate with the plurality of cable spool interlocking fingers. In some embodiments, the cable spool is vertically symmetrical and horizontally symmetrical. In some embodiments, the cable spool comprises a plurality of cable spool parts that assemble with and disassemble from each other, wherein the cable when wound around the cable spool prevents disassembly of the plurality of cable spool parts. In some embodiments, the plurality of cable spool parts consists of two cable spool parts. In some embodiments, the two cable spool parts are identically shaped.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures:

FIG. 1 illustrates a front perspective view of a NID cabinet according to some embodiments.

FIG. 3 illustrates the removable mounting features of FIG. 2 in greater detail.

FIG. 5 illustrates perspective front views of the removably mounted cable spool.

FIG. 6 illustrates the fixed mounting features from FIG. 2 in greater detail.

FIG. 7 illustrates the fixedly mounted cable spool assembled.

DETAILED DESCRIPTION OF THE EMBODIMENTS

Figure 2:
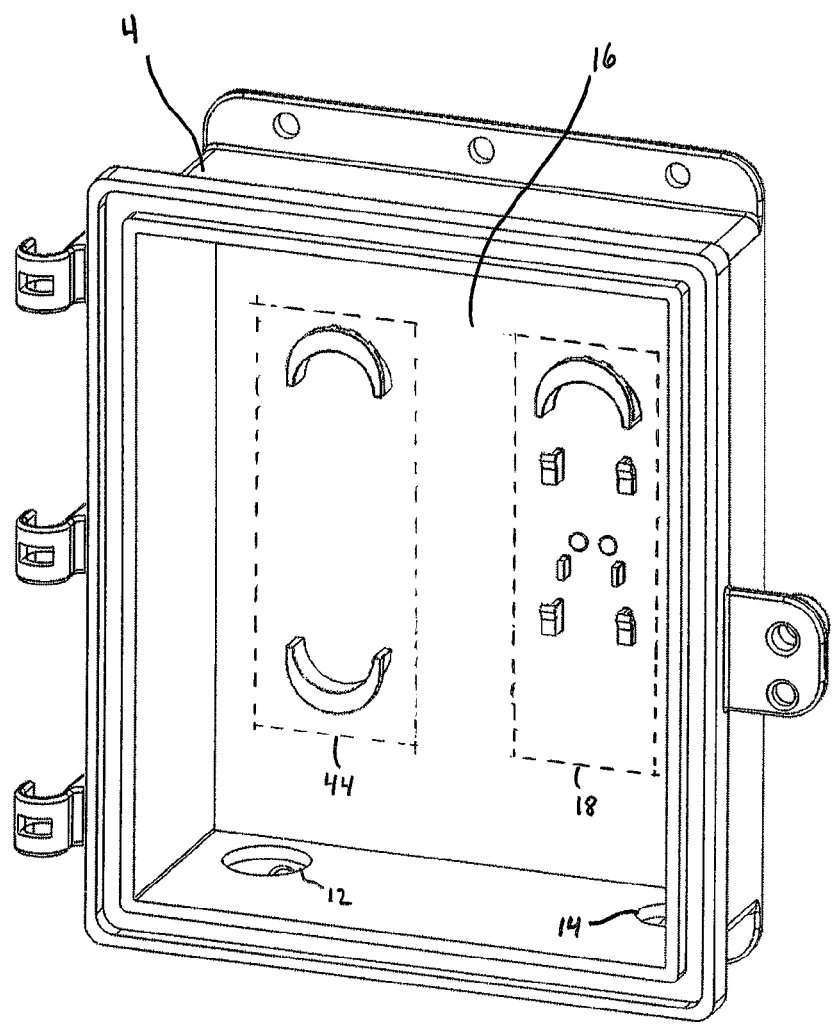
FIG. 2 illustrates a front perspective view of the NID cabinet from FIG. 1 with the lid and cable spools removed.

Embodiments of the present application are directed to a NID cabinet. Those of ordinary skill in the art will realize that the following detailed description of the NID cabinet is illustrative only and is not intended to be in any way limiting. Other embodiments of the NID cabinet will readily suggest themselves to such skilled persons having the benefit of this disclosure.

Reference will now be made in detail to implementations of the NID cabinet as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 1 illustrates a front perspective view of a NID cabinet according to some embodiments. The NID cabinet 2 includes a base 4 and lid 6 coupled to the base 4. Within an interior of the base 4 are positioned multiple cable spools. In this exemplary embodiment, the NID cabinet 2 is configured to hold two cable spools, a cable spool 8 and a cable spool 10. It is understood that alternative configurations can hold a single cable spool or more than two cable spools. Each cable spool is configured to hold spooled cable (not shown). As used herein, "cable" refers to any electrical transmission line having an interior transmission signal medium and an outer insulating layer. In some embodiments, the electrical transmission line is a network communications line such as coaxial cable or optical fiber used in cable television, internet and/or telephone networks. A cable has a first end and a second end, each end terminated by a cable connector. The base 4 also includes a network interconnection junction 5 having multiple network interface connectors. Each network interface connector is configured to mate with a cable connector of cable spooled on one of the cable spools. In the exemplary configuration where the base 4 is configured to house two cable spools, such as in FIG. 1, the network interconnection junction 5 includes two network interface connectors, one network interface connector for mating with a cable connecter on a first end of cable spooled around cable spool 8 and another network interface connector for mating with a cable connecter on a first end of cable spooled around cable spool 10.

Each cable spool is either fixedly mounted or removably mounted within the base 4 depending on the types of mounting features fabricated on a back wall of the base 4 and on the cable spool. There are two different types of mounting features on the back wall, fixed mounting features and removable mounting features. Each type of mounting feature is permanently fabricated as part of the back wall of the base 4. In some embodiments, each cable spool is assembled from multiple disparate parts that can be repeatedly assembled and disassembled., as described later in relation to FIGS. 7-9. As used herein "fixedly mounted" refers to the cable spool being assembled and fixed to the back wall of the NID cabinet. While in the assembled state, the cable spool is interlocked with the fixed mounting features and locked in position against the back wall of the NID cabinet. Only by disassembling the cable spool into its constituent parts can the cable spool parts be removed from the mounted position against the NID back wall. Spooling cable around the fixedly mounted cable spool prevents the assembled cable spool from being disassembled. As such, in order to disassemble the fixedly mounted cable spool for dismounting, any spooled cable must first be removed. As used herein "removably mounted" refers to the cable spool being assembled and attached to the removable mounting features. While in the assembled state, the cable spool is interlocked with the removable mounting features and locked in position against the back wall of the NID cabinet. However, a cable spool that is removably mounted can be dismounted while fully assembled, either with or without spooled cable still wrapped around the cable spool.

FIG. 2 illustrates a front perspective view of the NID cabinet 2 from FIG. 1 with the lid 6 and cable spools 8, 10 removed. The base 4 includes an opening 12 through which passes cable spooled on cable spool 8, and an opening 14 through which passes cable spooled on cable spool 10. On the back wall 16 are removable mounting features 18 and fixed mounting features 44. FIG. 3 illustrates the removable mounting features 18 from FIG. 2 in greater detail. The removable mounting features 18 include a radius 20, interlocking fingers 22, detent protrusions 24 and stop protrusions 26. The radius 20 includes a trapping radius 31 that rests against the back wall 16 (FIG. 2) of the base 4, and radius lip 28 positioned away from the back wall 16. Multiple gussets 30 extend from the radius lip 28.

Figure 4:
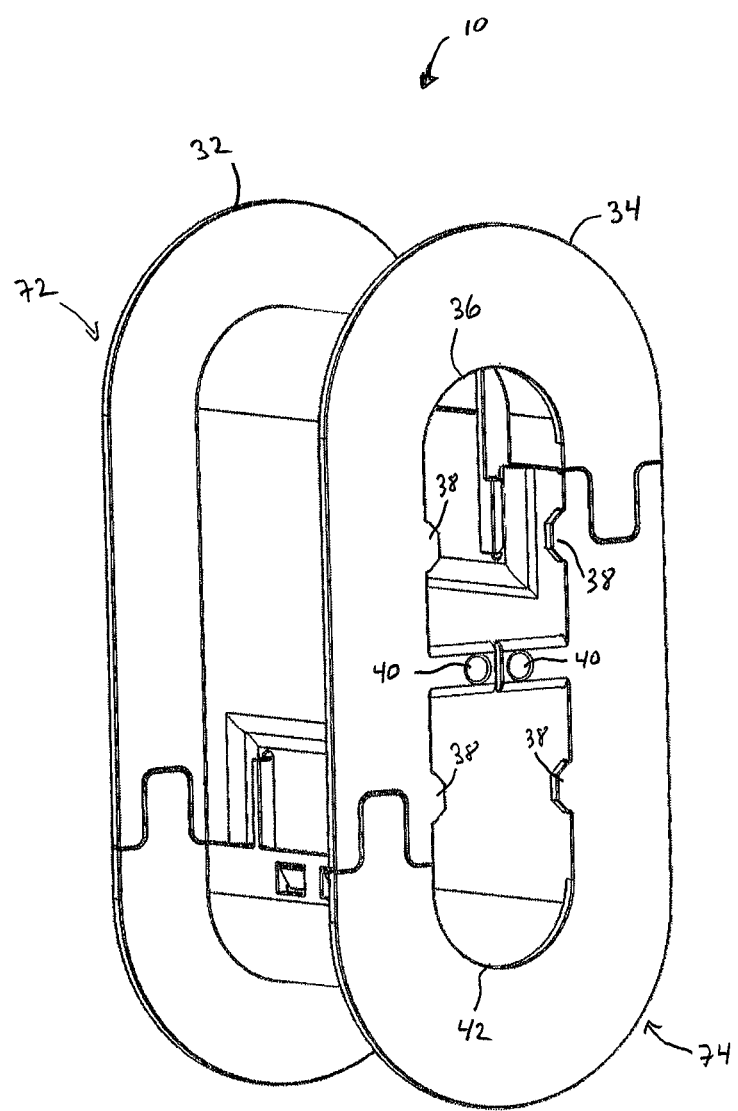
FIG. 4 illustrates a left back perspective view of the removable mounted cable spool.
Figure 5:
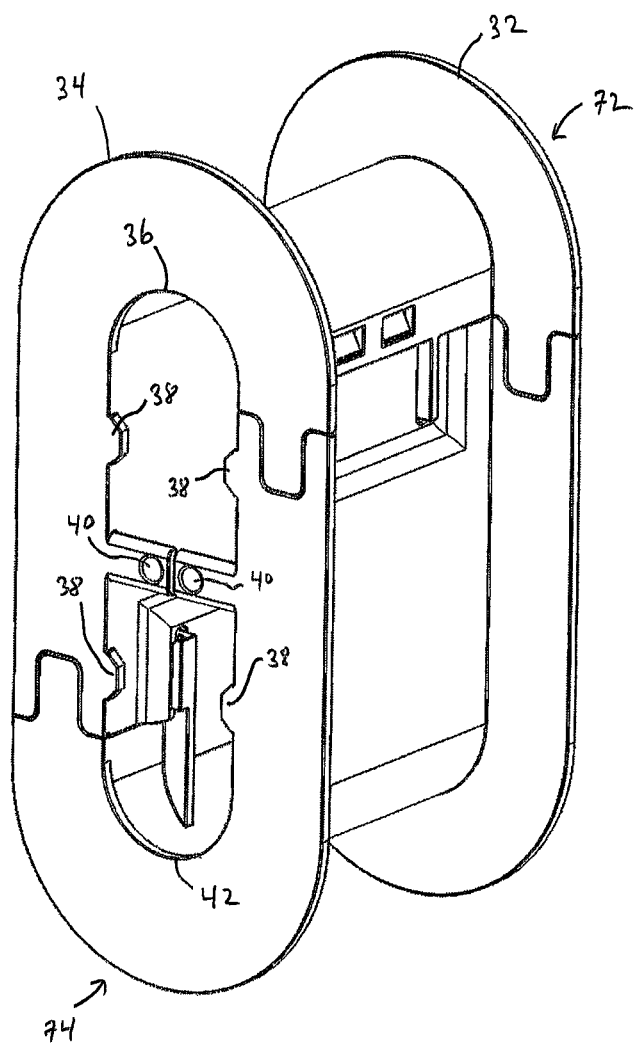
FIG. 5 illustrates a right back perspective view of the removable mounted cable spool.

FIG. 4 illustrates a left back perspective view of the cable spool 10. FIG. 5 illustrates a right back perspective view of the cable spool 10. The cable spool 10 is formed from two parts, a spool part 72 and a spool part 74, which are mated together. In some embodiments, such as that shown in FIGS. 4 and 5, the two spool parts 72, 74 are identical. The two spool parts 72, 74 are shown assembled in FIGS. 4 and 5. The two spool parts 72, 74 each include mating features for mating together. In some embodiments, the two spool parts 72, 74 include similar interconnect mating features as the two spool parts 76, 78 of the cable spool 8 shown in FIGS. 7-9. The cable spool 10 includes a front plate 32 and a rear plate 34. Each of the front plate 32 and the rear plate 34 has a radius 36, interlocking fingers 38, detent fingers 40 and a radius 42.

The cable spool 10 is retained in the NID cabinet 2 by first lifting the cable spool 10 such that radius 36 of the rear plate 34 is directly above the radius 20 on the back wall 16 of the base 4 (FIGS. 2 and 3) and such that the centers of radius 36 of the rear plate 34 and radius 42 of the rear plate 34 in FIGS. 4 and 5 are in the same vertical plane. Second, insuring that the height of the cable spool allows interlocking fingers 38 on rear plate 34 to clear the interlocking fingers 22 (FIGS. 2 and 3) on the back wall 16. Third, pushing the cable spool 10 inward towards the back wall 16 of the base 4 until the rear plate 34 of the cable spool 10 contacts the back wall 16 of the base 4. Fourth, sliding the cable spool 10 downward until the interlocking fingers 38 on the rear plate 34 are guided into and trapped in the interlocking fingers 22 on the back wall 16, and a lip of the radius 36 on the rear plate 34 is wedged behind the radius lip 28 of the radius 20 (FIG. 3). Fifth, continuing to slide the cable spool 10 downward until the detent fingers 40 on the rear plate 34 snap onto the detent protrusions 24 on the back wall 16, and the detent fingers 40 on the rear plate 34 rest against the stop protrusions 26 on the back wall 16. The cable spool 10 can be removed by reversing the steps 1-5 above. The architecture could be modified for more robust retention by the detent protrusion. Such an implementation would require an extension of the cable spool detent finger that would allow it to be accessed and pulled outwards towards the front of the NID cabinet.

FIG. 6 illustrates the fixed mounting features 44 from FIG. 2. The fixed mounting features 44 include a radius 46 and a radius 54. The radius 46 includes a trapping radius 48 that rests against the back wall 16 (FIG. 2) of the base 4, and radius lip 50 positioned away from the back wall 16. Multiple gussets 52 extend from the radius lip 50. Radius 54 has the same configuration as radius 46, but is aligned upside down relative to the radius 46.

Figure 8:
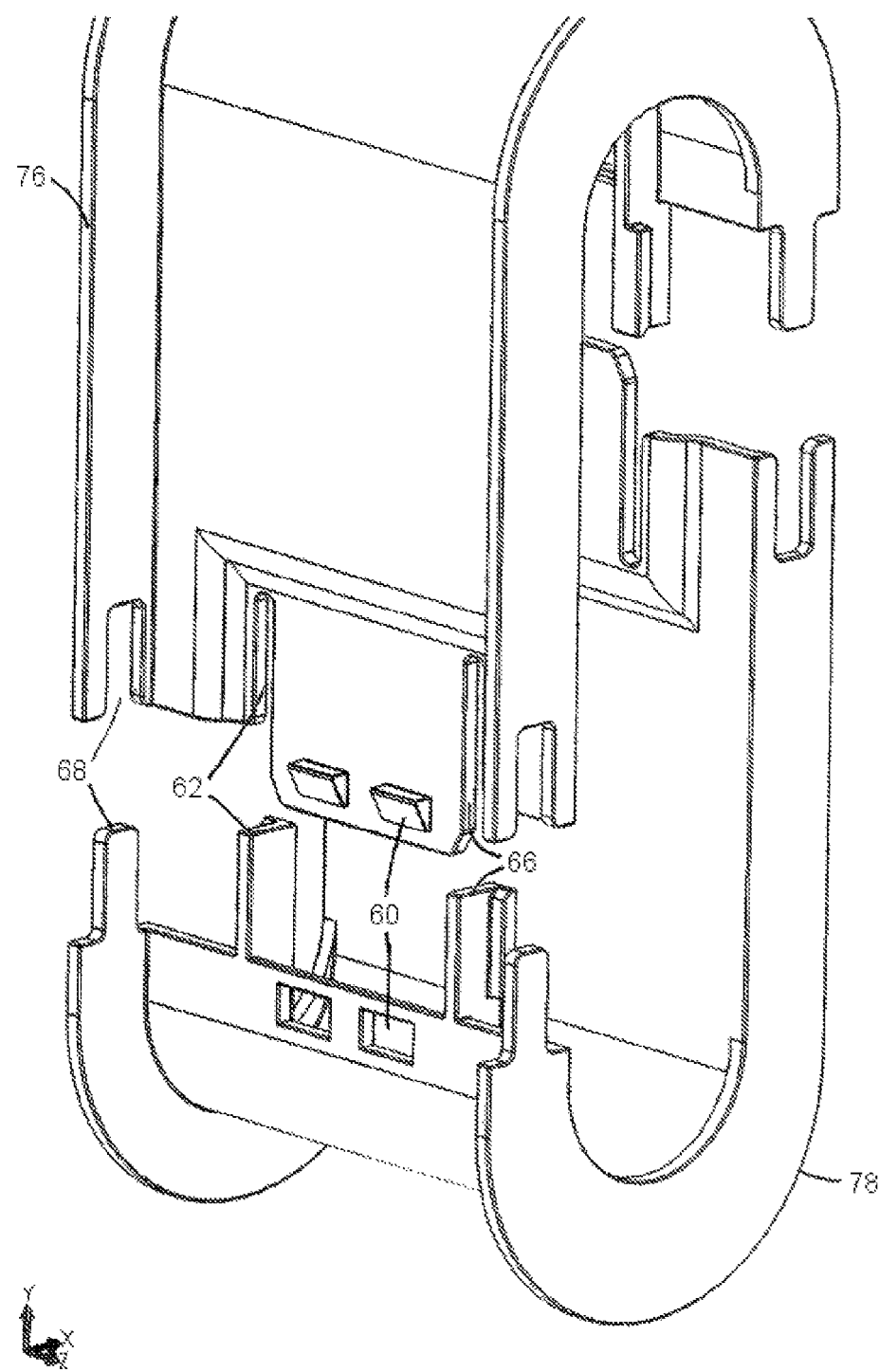
FIGS. 8-10 illustrate various angles of the two spool parts disassembled.
Figure 9:
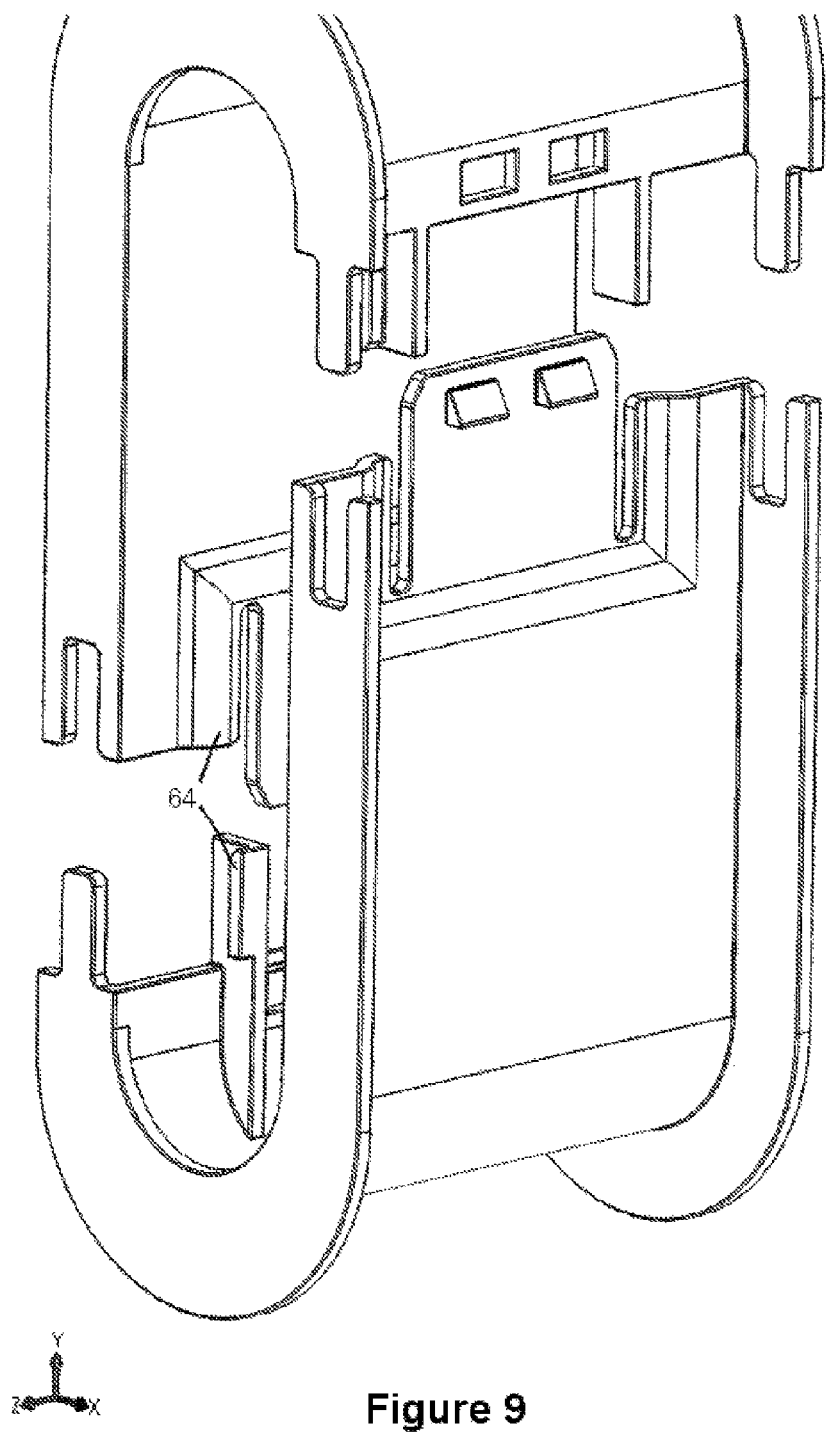
Figure 10:
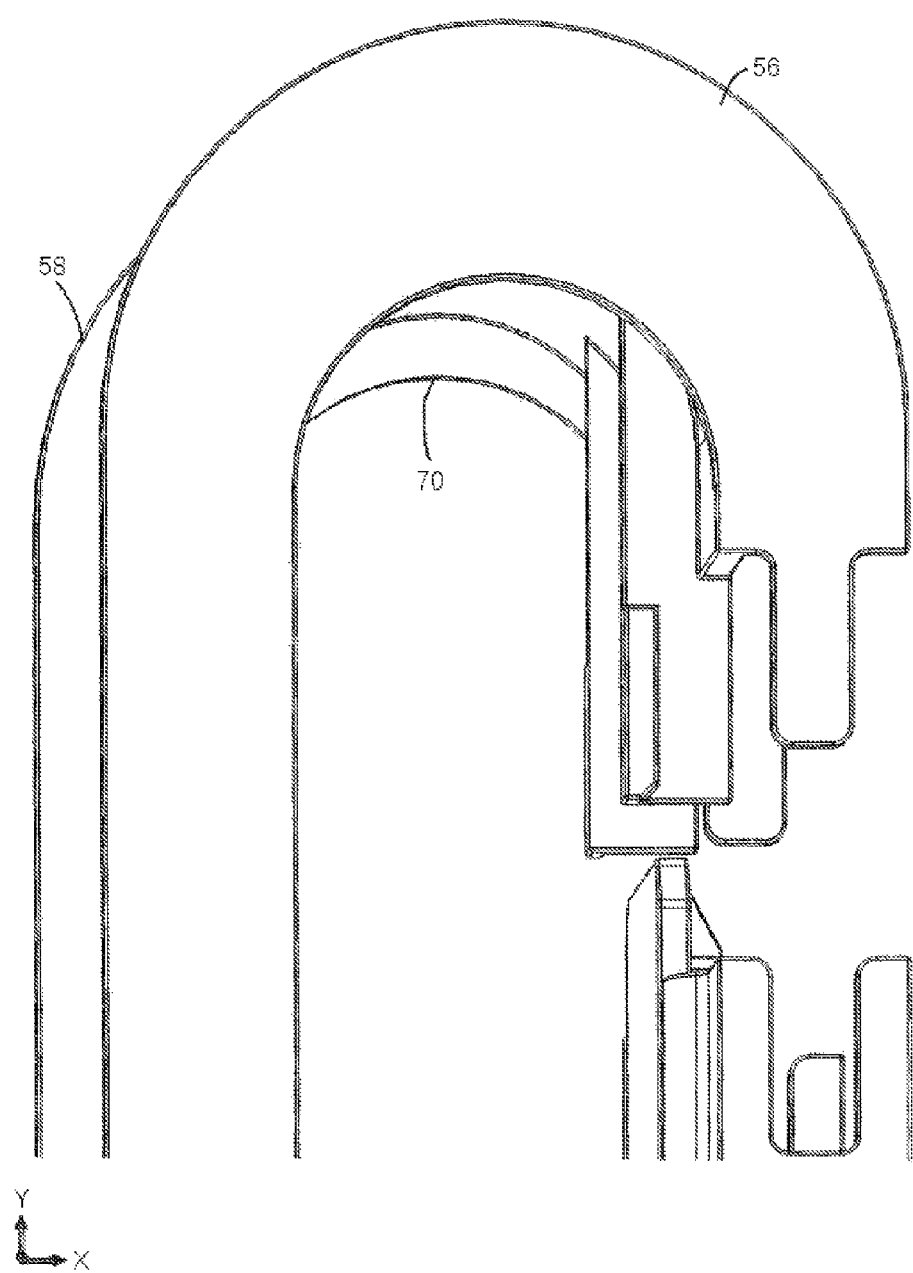

FIG. 7 illustrates the cable spool 8 assembled. The cable spool 8 is formed from two parts, a spool part 76 and a spool part 78, which are mated together. In some embodiments, such as that shown in FIG. 7, the two spool parts 76, 78 are identical. The cable spool 8 includes a front plate 56 and a rear plate 58. Both the front plate 56 and the rear plate 58 have a radius 70 and a radius 80. FIG. 8 illustrates the two spool parts 76, 78 disassembled. FIGS. 7-10 show various interconnect mating features for the two spool parts 76, 78 including snap pair 60, mate pair 62, mate pair 64, mate pair 66 and mate pair 68.

The interconnect mating features restrain the two spool parts 76, 78 in all directions as they are guided together for a positive locking snap. The two spool parts 76, 78 are initially separated and placed at the back wall 16 of the base 4 (FIGS. 2 and 6) such that radius 70 of spool part 76 is positioned above radius 46 (FIG. 6) and radius 80 of spool part 78 is positioned below radius 54 (FIG. 6). The separated spool parts 76, 78 are then snapped together such that radius 70 (FIG. 10) is trapped behind radius lip 50 (FIG. 6) and in contact with trapping radius 48 (FIG. 6), and radius 80 is trapped behind radius lip of radius 54 (FIG. 6) and in contact with trapping radius of radius 54 (FIG. 6). The spool parts 76, 78 are dimensioned such that they snap together just before the two trapping radii of radii 46, 54 (FIG. 6) interfere with the corresponding radii 70, 80. When cable is spooled around the cable spool 8, the spool parts 76, 78 are prevented from separating and therefore the cable spool 8 is prevented from being removed from the fixed mounting features 44. In this manner, the cable spool 8 is fixedly assembled in the NID cabinet 2 without the use of fasteners. Note that the full gravitational load of the cable is transferred to the upper spool part 76 and does not stress the interconnect mating features which connect the upper and lower spool parts 76, 78 since the cable hangs free off the lower spool part 78.

In some embodiments, the cable spool 10 has exactly the same radii features and size as the cable spool 8, and the radius 46 of the fixed mounting features 44 is the same as the radius 20 of the removable mounting features 18, which enables the cable spool 10 to be mounted on either the removable mounting feature 18 or the fixed mounting features 44.

In some embodiments, the cable spool 8 has the same interconnect mating features as the cable spool 10, and the radius 46 of the fixed mounting features 44 is the same as the radius 20 of the removable mounting features 18, which enables the cable spool 8 to be mounted on either the removable mounting feature 18 or the fixed mounting features 44.

In some embodiments, the outer edges of the rear plate and the front plate are smaller for cable spool 8 than for cable spool 10. This embodiment is shown in FIG. 1. Different sized rear plates and front plates of the cable spool can be used to accommodate spooling of different sized cables. For example, the last line cable used to connect the NID cabinet to a junction box is typically thicker than the inside wiring cable used to connect the NID cabinet to the inside wire in the end user location. Larger sized rear and front plates provide a larger volume within which to spool the larger sized cable.

In some embodiments, the cable spool is symmetrical from top to bottom (vertically symmetrical), from side to side (horizontally symmetrical) and from front to back. Being symmetrical, the cable spool can be installed upside down and/or front-side back relative to the aforementioned embodiments.

In the exemplary embodiments shown in FIGS. 1-10, the base 4 is configured with removable mounting features 18 for removably mounting cable spool 10 and is configured with fixed mounting features 44 for fixedly mounting cable spool 8. It is understood that the base can be alternatively configured with the types of mounting features reversed such that the cable spool 8 is removably mounted and the cable spool 10 is fixedly mounted. It is also understood that the base can be alternatively configured with only fixed mounting features such that both cable spools 8 and 10 are fixedly mounted, or the base can be alternatively configured with only removable mounting features such that both cable spools 8 and 10 are removably mounted. In either of these alternative base embodiments, the cable spools are configured with the appropriate mounting features.

The openings 12 and 14 (FIG. 2) in the base 4 are shown as enclosed openings, which requires cable to be threaded through the openings. Alternatively, the openings can be configured as laterally open-ended slots that enable the cable to simply be slid into the slot. The slot enables the cable spool to be mounted into the base while the cable is externally connected. In this manner, cable can be more easily installed from the junction box to the NID cabinet. For example, the cable spool can be used as a transport device between the factory and on-site. When on-site, one end of the cable spooled to the cable spool is connected to the junction box. As the installer then walks from the junction box to the NID cabinet, cable is un-spooled from the cable spool. Once the installer reaches the NID cabinet, the cable un-spooled from the cable spool is slid through the slot in the base, the second end of the cable is connected to the network interface connector and the cable spool is mounted to the removable mounting features. In this manner, the cable spool protects the cable during shipping, and also aids the installer in running cable between the junction box and the NID cabinet.

The present application has been described in terms of specific embodiments incorporating details to facilitate the understanding of the principles of construction and operation of the NID cabinet. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A network interface device cabinet comprising:
   a. a base having an interior cavity with a back wall, wherein the back wall comprises back wall mounting features permanently fabricated as part of and protruding from the back wall, wherein the back wall mounting features comprise a cabinet radius feature extending from the back wall;
   b. a removable cable spool configured for a cable to be spooled about the removable cable spool, wherein the removable cable spool comprises cable spool mounting features configured to removably mate with the back wall mounting features on the back wall of the base, wherein the cable spool comprises a first plate and a second plate between which the cable is spooled, and the cable spool mounting features are disposed on the first plate, further wherein the first plate comprises an interior opening, and the cable spool mounting features comprise a cable spool radius feature formed from a portion of the interior opening in the first plate, wherein the cabinet radius feature comprises a trapping radius and a radius lip, configured such that the cable spool radius feature is positioned on the trapping radius and between the radius lip and the back wall when the removable cable spool is removably mounted; and
   c. a lid coupled to the base to cover and uncover the interior cavity.

2. The network interface device cabinet of claim 1 wherein the base further comprises an enclosed opening extending from the interior cavity to outside the base through which cable is threaded.

3. The network interface device cabinet of claim 1 wherein the base further comprises a network interconnection junction having multiple network interface connectors, wherein a first end of the cable has a cable interconnect and the cable interconnect is configured to mate with one of the multiple network interface connectors.

4. The network interface device cabinet of claim 1 wherein the cable spool mounting features further comprise a plurality of cable spool interlocking fingers, further wherein the plurality of cable spool interlocking fingers are formed on the first plate and extend into the interior opening of the first plate.

5. The network interface device cabinet of claim 4 wherein the back wall mounting features further comprise a plurality of cabinet interlocking fingers extending from the back wall and configured to mate with the plurality of cable spool interlocking fingers.

6. The network interface device cabinet of claim 1 wherein the cable spool is vertically symmetrical and horizontally symmetrical.

7. The network interface device cabinet of claim 1 wherein the cable spool comprises a plurality of cable spool parts that assemble with and disassemble from each other, wherein the cable when wound around the cable spool prevents disassembly of the plurality of cable spool parts.

8. The network interface device cabinet of claim 7 wherein the plurality of cable spool parts consists of two cable spool parts.

9. The network interface device cabinet of claim 8 wherein the two cable spool parts are identically shaped.

* * * * *